May 21, 1968   W. J. KUDLATY ET AL   3,384,242
APPARATUS FOR REMOVING ENTRAPPED AIR IN FILTERS
Filed Oct. 11, 1965

INVENTORS.
WALTER J. KUDLATY
FOREST G. NICCUM
BY
*Parker & Carter*
ATTORNEYS.

United States Patent Office 3,384,242
Patented May 21, 1968

3,384,242
APPARATUS FOR REMOVING ENTRAPPED
AIR IN FILTERS
Walter J. Kudlaty, Elmhurst, and Forest G. Niccum,
Wood Dale, Ill., assignors to Marvel Engineering
Company, Chicago, Ill., a corporation of Delaware
Filed Oct. 11, 1965, Ser. No. 494,460
2 Claims. (Cl. 210—436)

ABSTRACT OF THE DISCLOSURE

An apparatus for removing entrapped gas in filters, said apparatus comprising a housing defining a filter chamber having at least one open end with a cover removably enclosing said open end, a fluid inlet for said chamber and a fluid outlet for said chamber located below the upper portion of the open end of said chamber. The apparatus further includes means to support the filter chamber and passage means extending from the upper portion of said chamber to the fluid outlet, said passage means having an interior cross-section of sufficient area to permit the passage of gas, but of insufficient area to permit the passage of hydraulic fluid under the pressure differential normally existent in the system between the inlet and outlet of said chamber.

---

This invention is concerned with hydraulic filters and more particularly with apparatus for bleeding entrapped gases from said filters.

An object of this invention is to eliminate entrapped air in a hydraulic filter housing.

Another object is to permit the bleeding of entrapped air from a hydraulic filter housing without loss of the hydraulic fluid being filtered.

Another object is a bleeder assembly easily adaptable to existing filter housings.

Another object is a bleeder apparatus connectable to the pressure gauge outlets of a conventional filter housing.

Another object is to provide for visual observation of the air bleeding process.

Another object is to remove entrapped air from a filter housing and discharge it into the filtered hydraulic fluid.

Another object is to automatically remove entrapped air from a filter housing.

Other objects may be found in the ensuing specification, drawings and claims in which:

Figure 1:
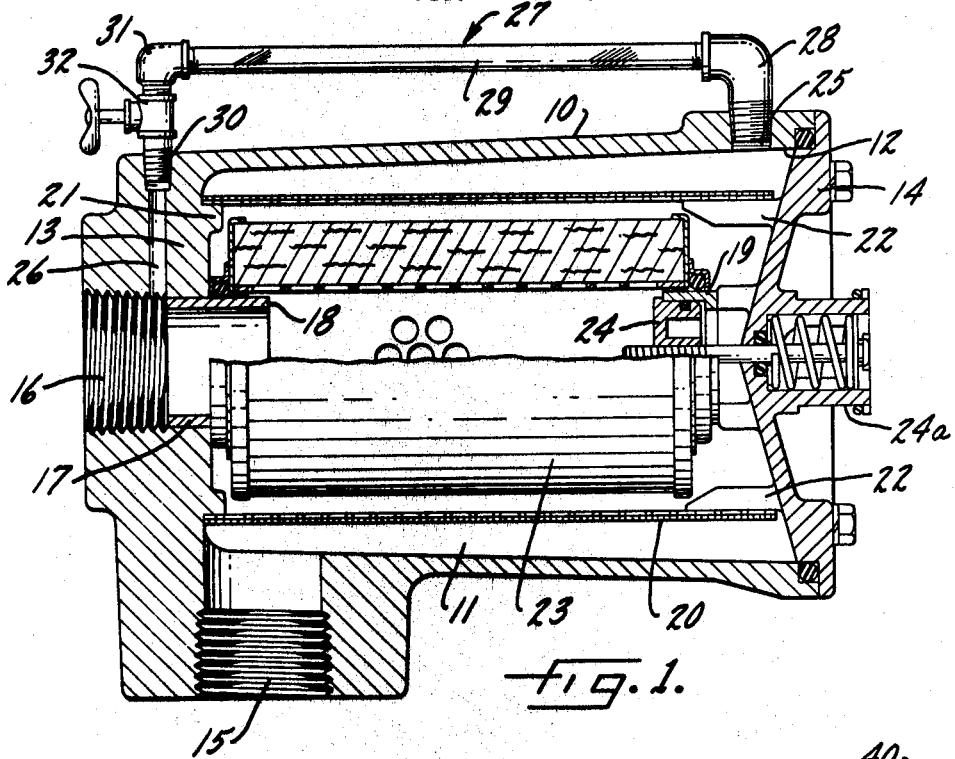
FIGURE 1 is a cross-sectional side elevational view of a filter housing assembly.

Referring now to the drawings and particularly to FIGURE 1, the numeral 10 indicates a filter housing having an interior chamber 11 of generally cylindrical shape extending from an open end 12 of the housing to a closed end 13. A cover 14 is provided to fit in the open end of the housing to close the chamber. The filter housing is also equipped with a fluid inlet 15 for the chamber and a fluid outlet 16 from the chamber.

A tubular sleeve 17 is positioned in the outlet to extend into the chamber with an end portion 18 of the sleeve located in the chamber and providing a support for a filter element. It should be noted that the inner diameter of the sleeve is smaller than the inner diameter of the outlet 16. Cooperating filter element support means 19 are provided on the inside of the cover 14.

A sleeve filter 20 is insertable in the chamber and is supported on the outer surfaces of an annular ridge 21 formed as part of the closed end of the chamber and a projection 22 formed as part of the cap. A filter element 23 fits inside the sleeve filter to be held by the end portion 18 of the sleeve 17 at the closed end of the chamber and the support 19 of the cap. A filter by-pass valve 24 and by-pass indicator 24a may be provided with the housing cap.

An aperture 25 may be provided in the housing 10 adjacent the open end 12 and a passage 26 may be provided in the closed end of the housing to extend from the outside of the housing to intersect the chamber outlet 16 adjacent the outer end of the sleeve 17. The aperture and passage may be connected by a bleeder assembly 27 consisting of an elbow 28 located in the aperture, a conduit 29 having one end connected to the elbow, a nipple 30 located in the passage, a second elbow 31 connected to the opposite end of the conduit and a valve 32 joining the nipple and said second elbow. The conduit 29 may conveniently be of transparent or translucent material.

Figure 2:
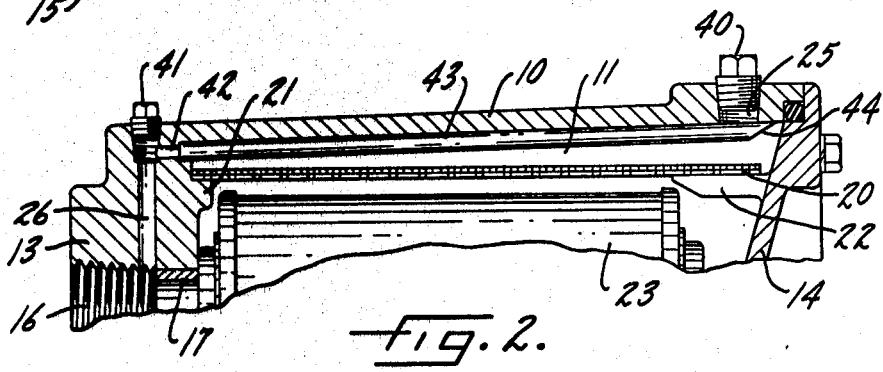
FIGURE 2 is a partial sectional view showing a modified form of the apparatus of FIGURE 1.

A modified form of the invention is shown in FIGURE 2 in which the aperture 25 and passage 26 to the outlet are closed respectively by plugs 40 and 41. A passage 42 is cut in the closed end 13 of the housing to connect the chamber 11 with the outlet passage 26. A tube 43 is positioned inside of the chamber 11 between the housing 10 and the sleeve filter 20 at the upper or higher portion of the housing. One end of this tube is press fitted into the passage 42 and its opposite end is positioned adjacent the open end of the housing. If, as is shown in FIGURE 2, the diameter of the chamber increases from the closed end 13 to the open end 12 of the housing, the tube is positioned with its opposite end elevated so as to extend to the uppermost portion of the chamber. The end of the tube adjacent the open end of the housing is chamfered, terminating in a plane 44 extending obliquely to the axis of the tube. The passage through the tube is made sufficiently large to permit the passage of air, but not large enough to permit the passage of the hydraulic fluid being filtered under the pressure differentials existing between the inlet and outlet of the filter housing under normal filtering conditions.

Figure 3:
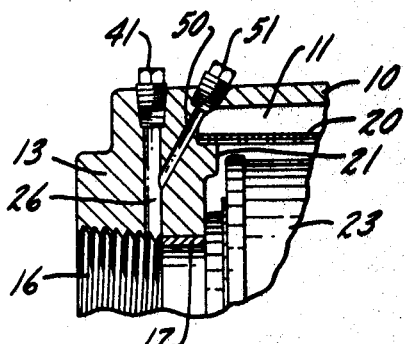
FIGURE 3 is an enlarged partial sectional view showing another modified form of the apparatus of FIGURE 1.

Another modified form of the invention is shown in FIGURE 3 in which a passage 50 is cut through the closed end 13 of the housing to connect the chamber 11 with the passage 26 which leads into the chamber outlet 16. A plug 51 is provided to close this passage at the outside of the housing. The cross-section of the passage is made sufficiently large to permit the passage of air from the chamber to the outlet passage, but too small to allow the passage of hydraulic fluid under the pressure differentials normally existing between the chamber and the outlet.

The use, operation and function of the invention are as follows:

Air and other gases in hydraulic fluids tend to accumulate at upper or higher portions of a hydraulic filter housing as the system is started and the fluid flows into the housing. These pockets of gas produce undesirable results such as noise in the pump due to the expansion and contraction of these gases as the pressure in the pump changes. A reduction in the efficiency of the filter can occur if the volume of entrapped gases in a filter housing increases sufficiently so that portions of the filter are not being immersed in the hydraulic fluid being filtered. Difficulties of this nature can arise in a filter housing of the type illustrated in the drawings when it is positioned so as to create a pocket for entrapped air, e.g. when, as shown, a portion of the housing chamber 11 is located above the outlet 16. Means are provided to bleed gases from the gas-entrapping portion of the housing, which in this instance would be the top of the chamber adjacent the open end 12 of the housing. While the illustrations show the filter housing positioned with the longitudinal axis of the chamber extending in a generally horizontal direction, it should also be realized that the same problem would exist if the housing were positioned with the longitudinal axis of the chamber in a generally vertical position and the open end of the housing upright.

This invention solves the problem of removing the entrapped gas by sucking it from the trapped portion of the chamber and diffusing it into the chamber outlet. The drawings illustrate several different conduit systems utilizing suction or diffusion produced by the flow of fluid through the filter outlet and past the mouth of passage 26. As shown in the drawings, the sleeve 17 that extends from the chamber into the outlet 16, has an interior diameter less than that of the outlet so that the sleeve in effect acts as a nozzle or jet to increase the velocity of the hydraulic fluid flow therethrough, thus aiding the creation of a slight suction or reduced pressure area in the outlet adjacent the passage 26. The conduit leading to the trapped portion of the chamber connects with this reduced-pressure area through means of the passage 26. Thus, the suction or negative pressure caused by the flow of hydraulic fluid through the sleeve will draw the entrapped gas through the conduit and discharge it into the hydraulic fluid outlet. In addition to this negative pressure or pressure differential caused by the fluid flow through sleeve 17, and outlet 16, there is also a pressure differential between the chamber and the outlet due to the pressure drop across the filter and this pressure differential may also contribute to movement of the entrapped air from the chamber to the outlet.

In FIGURE 1, the apparatus for moving the entrapped air to the filtered fluid outlet 16 runs outside of the housing through means of a conduit 29 and appropriate fittings. A valve 32 is provided to shut off the flow as soon as the entrapped gas is completely exhausted from the chamber. To facilitate this operation, the conduit 29 may be made of a transparent material to enable the operator to detect the flow of hydraulic fluid.

The form of the invention shown in FIGURE 2 is intended for automatic operation. In this construction, a tube 43 is positioned inside the chamber to extend from adjacent the open end of the housing into the passage 26. The opening through the tube is selected so that it is large enough to permit the passage of air under the normal pressure differential between the chamber and the portion of the outlet 16 adjacent the sleeve nozzle 17, but is too small to permit the passage of the more viscous hydraulic fluid under this pressure differential. Thus, the apparatus is fully automatic in operation and will stop the bleeding action when hydraulic fluid is drawn into the tube.

A third form of the invention is shown in FIGURE 3, in which the conduit from the chamber 11 to the outlet passage 26 consists of a passage 50 drilled through the end wall 13 of the housing. As in the case of the tube 43, the area of this passage is sufficiently large to permit the passage of air, but too small to allow the passage of the more viscous hydraulic fluid. Thus, this passage will also automatically bleed air, but will preclude the flow of hydraulic fluid therethrough.

We claim:

1. In a filter element assembly for use as a hydraulic filter, said assembly including a housing defining a generally cylindrical filter chamber having an upper portion with at least one open end, a cover removably enclosing said open end, a filter element mounted within said chamber, a fluid inlet, and a fluid outlet located below the highest portion of said chamber, the improvement comprising:

an apparatus for automatically removing entrapped gas from fluid in the filter chamber consisting of an internal passage means having a tubular member substantially parallel to the axis of said chamber, said tubular member extending from the upper portion of said chamber to a passage, said passage leading to a reduced pressure area in the fluid outlet, said fluid outlet including a sleeve extending into said chamber having an inner diameter smaller than the inner diameter of said outlet so that said sleeve acts as a nozzle to create the reduced pressure area in said outlet thereby drawing the entrapped gas through said passage means and discharging it into said outlet.

2. The structure of claim 1 further characterized in that said passage means has an interior cross-section of sufficient area to permit the passage of gas therethrough but of insufficient area to permit the passage of hydraulic fluid under the pressure differential normally existing between said fluid inlet and said fluid outlet of said chamber.

References Cited

UNITED STATES PATENTS

| | | | |
|---|---|---|---|
| 605,110 | 6/1898 | Loew | 210—226 |
| 2,792,116 | 5/1957 | Lenz et al. | 210—443 X |
| 2,804,977 | 9/1957 | Braswell | 210—95 |
| 2,996,190 | 8/1961 | Harry | 210—436 |
| 3,011,643 | 12/1961 | McCoy | 210—169 |
| 3,113,925 | 12/1963 | Rosaen | 210—436 X |
| 3,288,289 | 11/1966 | Rosaen | 210—90 |
| 3,288,290 | 11/1966 | Rosaen | 210—90 |

SAMIH N. ZAHARNA, *Primary Examiner.*

REUBEN FRIEDMAN, *Examiner.*

C. DITLOW, *Assistant Examiner.*